April 20, 1937.  A. T. WILLS ET AL  2,077,606
VEHICULAR JACK
Original Filed March 13, 1936  2 Sheets-Sheet 1
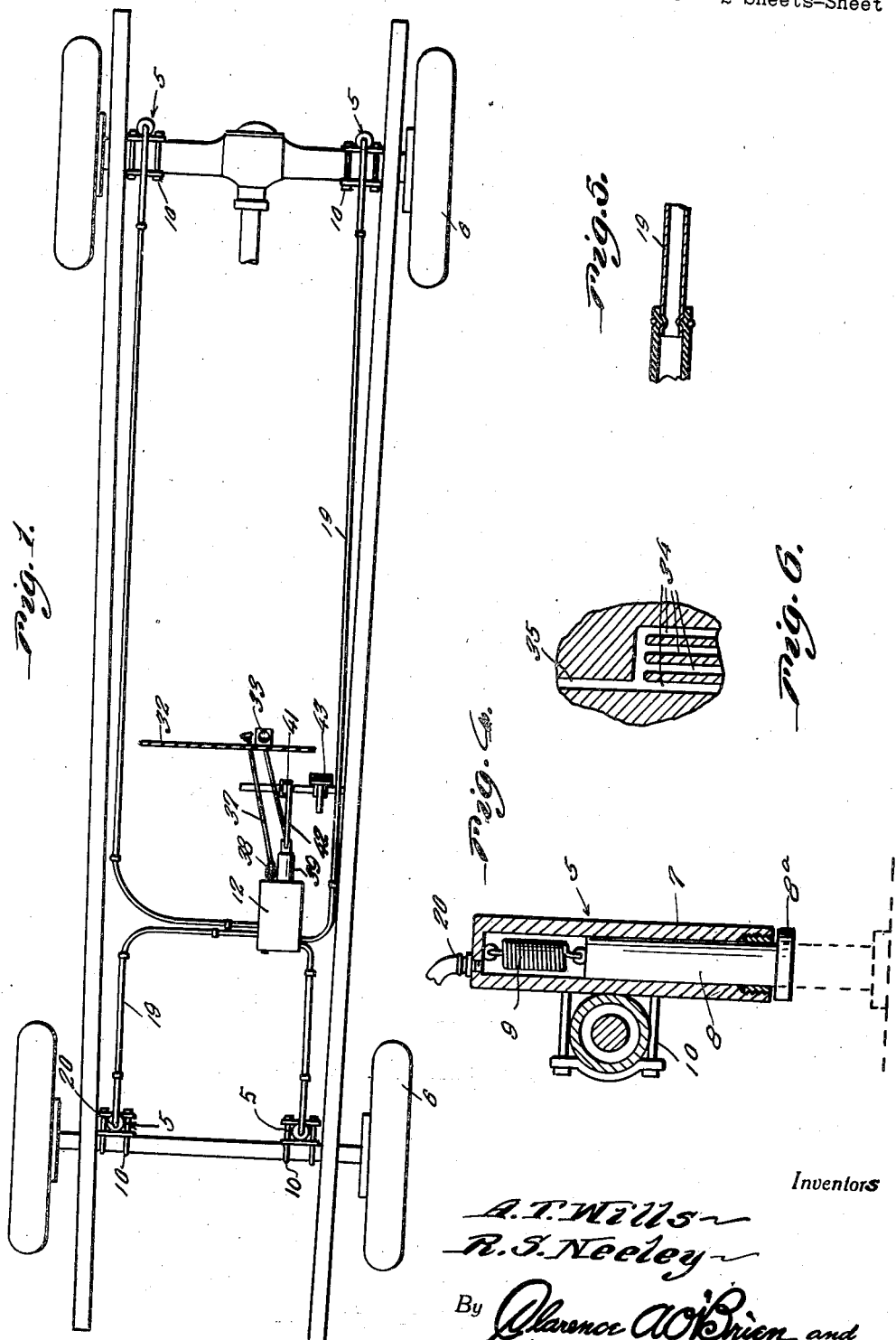
Inventors
A. T. Wills
R. S. Neeley
By Clarence A. O'Brien and
Hyman Berman Attorneys April 20, 1937. A. T. WILLS ET AL 2,077,606
VEHICULAR JACK
Original Filed March 13, 1936 2 Sheets-Sheet 2
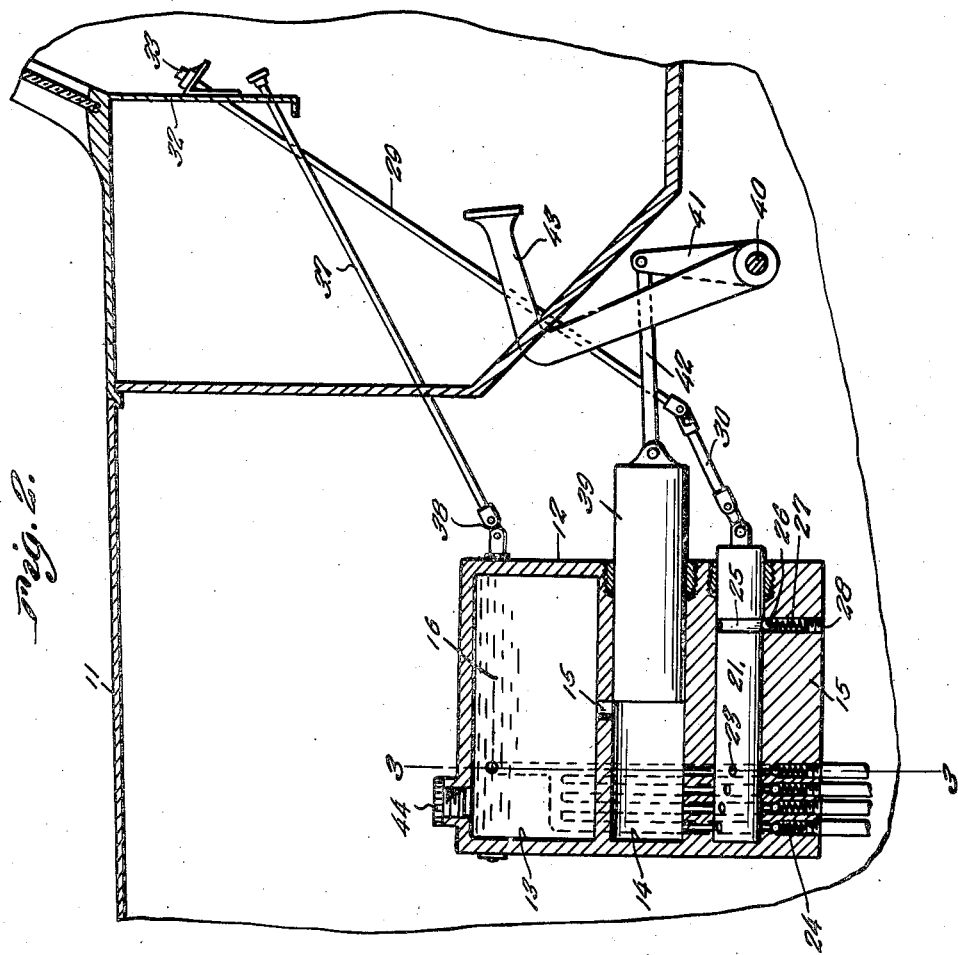
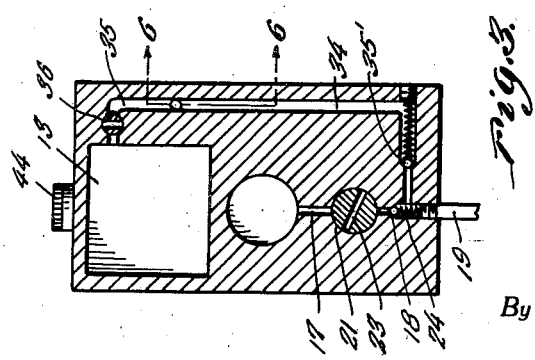

Patented Apr. 20, 1937

2,077,606

UNITED STATES PATENT OFFICE 2,077,606

VEHICULAR JACK

Arthur T. Wills and Robert S. Neeley, Prospect, Oreg.

Application March 13, 1936, Serial No. 68,726
Renewed February 6, 1937

2 Claims. (Cl. 60—54.5)

This invention relates to jacks for vehicles, such as automobiles and the like, and an object of the invention is to provide an automobile jack assembly of the hydraulic type whereby a selected wheel of the automobile may be readily and easily raised for changing a tire, or for any other purpose.

A still further object of the invention is to provide a simplified form of hydraulic jack assembly for motor vehicles which can be readily operated by the foot and which consists broadly in a plurality of jacks, one mounted adjacent each wheel of the vehicle, together with means for forcing the fluid under pressure to a selected jack for operating the same to raise the selected wheel of the vehicle.

A still further object of the invention is to provide means whereby the hydraulic jack assembly may be operated directly from the clutch pedal of the vehicle.

The invention together with its objects and advantages will be best understood from a study of the following description taken in connection with the accompanying drawings wherein:

Figure 1 is a plan view illustrating the application of the invention to a motor vehicle.

Figure 2 is an enlarged detail view partly in section and partly in elevation and illustrating the hydraulic pump and associated parts for controlling the supply of oil to the selected jack, and for the bleeding of the jack.

Figure 3 is a detail sectional view taken substantially on the line 3—3 of Figure 2.

Figure 4 is a detail sectional view through a jack.

Figure 5 is a detail sectional view showing the manner of coupling a flexible conduit section with a rigid conduit section and Figure 6 is a detail view taken substantially on the line 6—6 of Figure 3.

Referring to the drawings by reference numerals it will be seen that in the preferred embodiment thereof, the invention comprehends the provision of four jacks each indicated generally by the reference numeral 5.

The jacks are mounted one adjacent each wheel 6 of the automobile and each jack includes a cylinder 7 having a plunger 8 mounted therein for reciprocation and provided at one end with a foot 8a to engage the ground as suggested in broken lines in Figure 4. Normally the plunger 8 is held in retracted position relative to the cylinder 7 through the medium of a suitably provided and anchored coil spring 9. Also, each cylinder is provided with suitable means indicated generally at 10 for mounting the jack to the axle or axle housing as the case may be and in proximity to a wheel 6 of the vehicle.

Suitably mounted under the hood 11 of the automobile is a casting 12 suitably formed to provide an oil chamber or reservoir 13, a pump cylinder 14 and a valve casing 15. In the wall common to the reservoir 13 and the pump cylinder 14 is a port 15 through which oil or the like 16 in the reservoir 13 passes into the pump cylinder 14 to be pumped to the cylinder 7 of a selected jack 5.

In connection with the above it will be noted that in the wall common to the pump cylinder 14 and the valve casing 15 there are provided ports 17, there being four of such ports 17, one for each of the jack cylinders.

In alinement with the ports 17, the wall of the valve casing 15 is provided with ports 18 into the ends of which opening through the wall of the valve casing are threaded the ends of conduits 19 there being one conduit 19 for each jack, and each conduit 19 is suitably connected with the top of the cylinder 7 of its respective jack as indicated generally at 20 and as shown in Figure 4.

Controlling communication between the ports 17 and 18 and having a rotating fit within the valve casing 15 is a valve core 21 provided with four angularly related ports 23 extending therethrough and alinable selectively with the ports 17 and 18 in a manner to control the supply of fluid to a selected pump cylinder.

The ports 18 are provided with spring pressed check valves 24 to prevent fluid backing up through the ports as will be apparent.

Also as clearly shown in Figure 2 the valve core 21 is provided with a peripheral groove 25 in which operates a ball or the like 26 normally urged into engagement with the groove through the medium of a spring 27 the tension of which is adjusted by a plug or screw 28. Ball 26 operating in the groove 25 offers resistance to a turning movement of the valve 21 and also prevents axial movement of the valve within the valve casing.

For rotating the valve 21 there is provided a suitable operating rod 29 having a suitable link connection 30 with the valve 21. At its upper end the control rod 29 extends through the instrument board 32 of the automobile and is suitably equipped as at 33 to facilitate turning of the rod 29 for placing the valve 21 at the desired adjustment. In this connection it will be appreciated that a suitable dial and index may be associated with the knob equipped end 33 of the rod in order to enable the operator to determine when the selected port 23 is brought into alinement with the selected ports 17 and 18 for supplying fluid to a selected jack 5.

Return of fluid from the several jacks will be through the conduits 19 the passages 18 below the check valve 24 and passages 34 formed in the casting and opening at one end into the ports 18. Where the passages 34 meet the passages 18 they are equipped with suitable spring pressed check valves 35' as shown in Figure 3 to prevent the fluid in the passages 34 backing up into the passages 18.

The passages 34 merge into a single return passage 35 that leads to the reservoir 13 as also shown in Figure 3 and in this return passage 35 there is provided a suitable valve 36 controlled from the instrument board through the medium of a control rod 37 connected as at 38 with the valve 36.

For operating the pump piston 39 which is mounted for reciprocation within the pump cylinder 14 there is provided on the clutch pedal shaft 40 of the motor vehicle an arm 41 which is connected through the medium of a piston rod 42 with the piston 39 as shown in Figure 2. It will thus be seen that by working the clutch pedal 43 of the automobile back and forth piston 39 will be reciprocated for forcing fluid from the reservoir through the pump and through a selected conduit 19 to the cylinder of the selected jack 5 for lowering the plunger 8 of the jack and thereby raise the selected wheel 6 of the vehicle from the ground.

The operation of the device may be briefly explained as follows: First the reservoir 13 is supplied with suitable fluid being provided with a suitable filling neck and plug 44 as shown, and also provided with a suitable air vent. When it is desired to raise one of the wheels 6 of the automobile the operator rotates the rod 29 which in turn rotates the valve member 21 to bring the selected passage 23 thereof into registry with the proper alined ports 17 and 18. The operator then presses on the pedal 43 in a manner to reciprocate the pump piston 39. This will cause oil 16 from the reservoir to be pumped through alined passages 17, 23, 18 and through the proper conduit 19 into the cylinder 7 of the proper jack 5 causing the plunger 8 of the jack to move downwardly to place the foot 9 of the jack into engagement with the ground against the opposition of spring 9 in a manner to raise the selected wheel 6.

When it is desired to lower the wheel 6 the valve 21 is manipulated to move the passage 23 thereof out of alinement with the aforementioned ports 17 and 18 while valve 36 is moved to open position. Thus under the weight of the automobile the cylinder 7 of the aforementioned jack will move downwardly, and at the same time spring 9 will tend to draw the plunger 8 inwardly of the cylinder 7. This will cause the fluid in the cylinder to be forced therefrom through the conduit 19 and passage 18 into the passage 34 past the valve 35. From the passage 34 the fluid will pass into the passage 34a and from that passage through the valve 36 back to the reservoir 13.

It will thus be seen that we have provided means whereby jacks may be carried at all times in proper position adjacent each of the several wheels of the automobile and whereby further the jacks may be selectively operated for raising a desired wheel of the automobile.

Having thus described the invention, what is claimed as new is:

1. In a hydraulic jack assembly for motor vehicles comprising a plurality of jacks one mounted on the vehicle adjacent each wheel, each jack including a jack cylinder, a plunger mounted for reciprocation within each jack cylinder and having a part operating through an opening in the lower end of the jack cylinder and a foot on the free end of the plunger, spring means engaging the plunger and normally urging the same upwardly within the jack cylinder; and means for supplying the jack cylinder of a selected jack with liquid for moving the plunger downwardly in opposition to said spring, whereby to engage said foot with the ground to effect a lifting of a selected wheel of the automobile, said liquid supply means including a casting having an oil reservoir formed in the upper portion thereof, a valve casing in the lower portion thereof, and a pump cylinder between said reservoir and said valve casing, said casting being further provided with a port connecting the oil reservoir with said pump cylinder, and also with a plurality of ports, one for each of the jacks connecting the jack cylinder with the valve casing, conduits leading from one side of the valve casing in substantial alinement with the last named ports and connected with the respective jacks, a rotary valve mounted in the valve casing and provided with a plurality of ports for connecting a selected one of the last named ports with the conduit alined therewith for supplying fluid to a selected jack cylinder, a piston mounted for reciprocation within said pump cylinder, means for reciprocating said piston, means for rotating said valve, and check valves arranged in each of the last named ports.

2. In a hydraulic jack assembly for motor vehicles comprising a plurality of jacks one mounted on the vehicle adjacent each wheel, each jack including a jack cylinder, a plunger mounted for reciprocation within the cylinder and having each jack rod operating through an opening in the lower end of the jack cylinder and a foot on the free end of the plunger, spring means engaging the plunger and normally urging the same upwardly within the jack cylinder; and means for supplying the jack cylinder of a selected jack with liquid for moving the plunger downwardly in opposition to said spring, whereby to engage said foot with the ground to effect a lifting of a selected wheel of the automobile, said liquid supply means including a casting having an oil reservoir formed in the upper portion thereof, a valve casing in the lower portion thereof, and a pump cylinder between said reservoir and said valve casing, said casting being further provided with a port connecting the oil reservoir with said pump cylinder, and with a plurality of ports, one for each of the jacks connecting the jack cylinder with the valve casing, conduits leading from one side of the valve casing in substantial alinement with the last named ports and connected with the respective jacks, a rotary valve mounted in the valve casing and provided with a plurality of ports for connecting a selected one of the last named ports with the conduit alined therewith for supplying fluid to a selected jack cylinder, a piston mounted for reciprocation within said pump cylinder, means for reciprocating said piston, means for rotating said valve, check valves arranged in each of the last named ports, and conduit means connecting each of the last named ports with said oil reservoir to provide for a return flow of oil from each jack to the oil reservoir, a valve arranged in return conduit, and remote control means for said valve.

ARTHUR T. WILLS.
ROBERT S. NEELEY.